(12) United States Patent
Covington et al.

(10) Patent No.: US 7,595,959 B2
(45) Date of Patent: Sep. 29, 2009

(54) RECORDING HEADS INCLUDING A MAGNETICALLY DAMPED WRITE POLE AND RECORDING SYSTEMS INCLUDING SUCH HEADS

(75) Inventors: Mark William Covington, Pittsburgh, PA (US); Ganping Ju, Wexford, PA (US); Werner Scholz, Pittsburgh, PA (US); Michael Kevin Minor, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 566 days.

(21) Appl. No.: 11/170,035

(22) Filed: Jun. 29, 2005

(65) Prior Publication Data

US 2007/0003792 A1    Jan. 4, 2007

(51) Int. Cl.
*G11B 5/127* (2006.01)
(52) U.S. Cl. .................................. 360/125.02
(58) Field of Classification Search ........................ None
See application file for complete search history.

(56) References Cited

U.S. PATENT DOCUMENTS

| | | | |
|---|---|---|---|
| 3,946,404 | A | 3/1976 | Berkowitz et al. |
| 4,078,300 | A | 3/1978 | Lazzari |
| 4,423,450 | A | 12/1983 | Hamilton |
| 4,541,026 | A | 9/1985 | Benin et al. |
| 4,639,810 | A | 1/1987 | Sakai |
| 4,731,157 | A | 3/1988 | Lazzari |
| 4,931,886 | A | 6/1990 | Mallary |
| 5,439,754 | A | 8/1995 | Iwasaki et al. |
| 5,606,478 | A | 2/1997 | Chen et al. |
| 5,668,689 | A | 9/1997 | Schultz et al. |
| 5,738,927 | A | 4/1998 | Nakamura et al. |

(Continued)

FOREIGN PATENT DOCUMENTS

DE    3544851    6/1987

(Continued)

OTHER PUBLICATIONS

Bailey et al., "Control of Magnetization Dynamics in Ni81Fe19 Thin Films Through the Use of Rare-Earth Dopants", IEEE Transactions on Magnetics, vol. 37, No. 4, Jul. 2001.

(Continued)

*Primary Examiner*—David D Davis
(74) *Attorney, Agent, or Firm*—Robert P. Lenart, Esq.; Alan G. Towner, Esq.; Pietragallo Gordon Alfano Bosick & Raspanti, LLP

(57) ABSTRACT

A magnetic recording system is disclosed in which the magnetization dynamics of the write head and recording medium are highly damped. The system may comprise a perpendicular recording head having a write pole, and a recording medium including a hard magnetic recording layer and a soft magnetic underlayer (SUL). The increased magnetic damping in the write pole and SUL suppresses precessional motion of the respective magnetizations, leading to a reduction in transition jitter caused by spurious head field fluctuations. The damping may be increased by providing films or multi-layer structures that are doped with rare earth or transition metal elements. Exchange coupled laminates of doped and undoped layers may optimize both the effective damping and write field in the recording system.

20 Claims, 4 Drawing Sheets

U.S. PATENT DOCUMENTS

| | | | |
|---|---|---|---|
| 5,777,828 A | 7/1998 | Kameyama et al. | |
| 5,801,910 A | 9/1998 | Mallary | |
| 5,812,350 A | 9/1998 | Chen et al. | |
| 5,864,450 A | 1/1999 | Chen et al. | |
| 5,896,252 A | 4/1999 | Kanai | |
| 5,991,126 A | 11/1999 | Hayashi et al. | |
| 5,995,343 A | 11/1999 | Imamura | |
| 6,033,792 A | 3/2000 | Kirino et al. | |
| 6,063,512 A | 5/2000 | Osaka et al. | |
| 6,163,442 A | 12/2000 | Gill et al. | |
| 6,198,597 B1 | 3/2001 | Tateyama et al. | |
| 6,282,056 B1 | 8/2001 | Feng et al. | |
| 6,317,290 B1 | 11/2001 | Wang et al. | |
| 6,452,240 B1 * | 9/2002 | Ingvarsson et al. | 257/421 |
| 6,477,765 B1 | 11/2002 | Herrera | |
| 6,525,902 B1 | 2/2003 | Hu et al. | |
| 6,645,647 B1 | 11/2003 | Litvinov et al. | |
| 6,646,827 B1 * | 11/2003 | Khizroev et al. | 360/125.03 |
| 6,660,357 B1 | 12/2003 | Litvinov et al. | |
| 6,777,113 B2 | 8/2004 | Weller et al. | |
| 6,818,330 B2 | 11/2004 | Shukh et al. | |
| 2005/0041342 A1 * | 2/2005 | Huai et al. | 360/324.12 |

FOREIGN PATENT DOCUMENTS

| | | |
|---|---|---|
| DE | 3544883 | 6/1987 |
| EP | 0 472 031 A2 | 2/1992 |
| JP | 2-29904 | 1/1990 |
| WO | WO 01/22407 A1 | 3/2001 |

OTHER PUBLICATIONS

Reidy et al., "Dopants for independent control of precessional frequency and damping in Ni81Fe19 (50 nm) thin films", Applied Phys. Letters, vol. 82, No. 8, Feb. 24, 2003.

Song et al., "Systematic control of high-speed damping in doped/undoped Ni81Fe19 (50nm) bilayer thin films", Journal of Applied Physics, vol. 95, No. 11, Jun. 1, 2004.

Ingvarsson et al., "Tunable magnetization damping in transition metal ternary alloys", http://www.arxiv.org/abs/cond-mat/0408608.

* cited by examiner ic recording systems typically include a recording head having a perpendicular writer and a recording medium such as a disk having a hard magnetic recording layer and a magnetic soft-underlayer (SUL). Such

RECORDING HEADS INCLUDING A MAGNETICALLY DAMPED WRITE POLE AND RECORDING SYSTEMS INCLUDING SUCH HEADS

FIELD OF THE INVENTION

The present invention relates to magnetic recording systems, and more particularly to the use of recording head write pole materials and recording media soft underlayer materials with controlled magnetic damping characteristics.

BACKGROUND OF THE INVENTION

Perpendicular magnetic recording systems typically include a recording head having a perpendicular writer and a recording medium such as a disk having a hard magnetic recording layer and a magnetic soft-underlayer (SUL). Such perpendicular magnetic recording systems may achieve recording densities of 100 or 200 Gbit/in$^2$, or higher, but are dominated by noise due to transition jitter. This problem will need to be overcome in order to increase areal density.

One source of jitter is large grains in the media, which lead to jagged boundaries between bits. Another source of jitter is spatial and temporal fluctuations of the head field, which unintentionally shift bit transitions from their intended location on the disk. For the latter case of head field fluctuations, the demands of high areal density recording are placing stringent requirements on the write field. For example, a typical transition jitter value of 2 nm corresponds to timing jitter of 143 ps for a linear velocity of 14 m/s.

These requirements, which are challenging by themselves, are even more difficult to satisfy given that these time scales are on the order of the precessional frequencies of the magnetic materials that comprise the recording head and media. This along with the fact that the data rates are already above 1 Gbit/s call for control of the magnetization dynamics in the recording head, recording medium, and soft underlayer.

The magnetization of a ferromagnet will rotate to align itself along the direction of a magnetic field. When the magnetic field is varied at low frequencies, the magnetization will smoothly follow the field. However, when the ferromagnet is driven by a high frequency field, the magnetization no longer follows the field and, instead, can potentially undergo precession. This occurs at frequencies comparable to the resonant precessional frequency of the magnetization, which is on the order of a few GHz for the magnetic materials typically used in disk drives. Since recording data rates are approaching these natural resonant frequencies, the magnetic materials that comprise the recording system may begin to precess when writing data.

The factor that determines whether or not the magnetization will precess is the magnetic damping, which is commonly parameterized by the dimensionless constant $\alpha$. This physical parameter characterizes the rate at which energy flows from the spin system to other excitations, such as phonons. In order to provide a recording system with well-behaved magnetic materials at recording frequencies, it is desirable to use materials that have relatively large $\alpha$ that ensures the magnetization dynamics are overdamped.

It would be desirable to provide recording systems having magnetic materials that are well behaved at recording frequencies in order to minimize jitter and improve the overall signal-to-noise ratio of the systems.

SUMMARY OF THE INVENTION

A magnetic recording system is provided in which the magnetization dynamics of the write head and recording medium are highly damped. The system may comprise a perpendicular recording head having a write pole, and a recording medium including a hard magnetic recording layer and a soft magnetic underlayer (SUL). The increased magnetic damping in the write pole and SUL suppresses precessional motion of the respective magnetizations, leading to a reduction in transition jitter caused by spurious head field fluctuations. The damping may be increased by providing films or multilayer structures that are doped with rare earth or transition metal elements. Exchange coupled laminates of doped and undoped layers may optimize both the effective damping and write field in the recording system.

An aspect of the present invention is to provide a magnetic recording system comprising a magnetic recording head including a magnetically damped write pole, and a recording medium including a magnetically hard recording layer and a magnetically damped soft underlayer.

Another aspect of the present invention is to provide a write pole of a magnetic recording head comprising a material doped with at least one rare earth and/or transition metal dopant which increases magnetic damping of the write pole.

A further aspect of the present invention is to provide a magnetic recording medium comprising a hard magnetic recording layer and a magnetically soft underlayer, wherein the soft underlayer comprises a material doped with at least one rare earth and/or transition metal dopant which increases magnetic damping of the soft underlayer.

These and other aspects of the present invention will be more apparent from the following description.

DETAILED DESCRIPTION OF THE INVENTION

Figure 1:
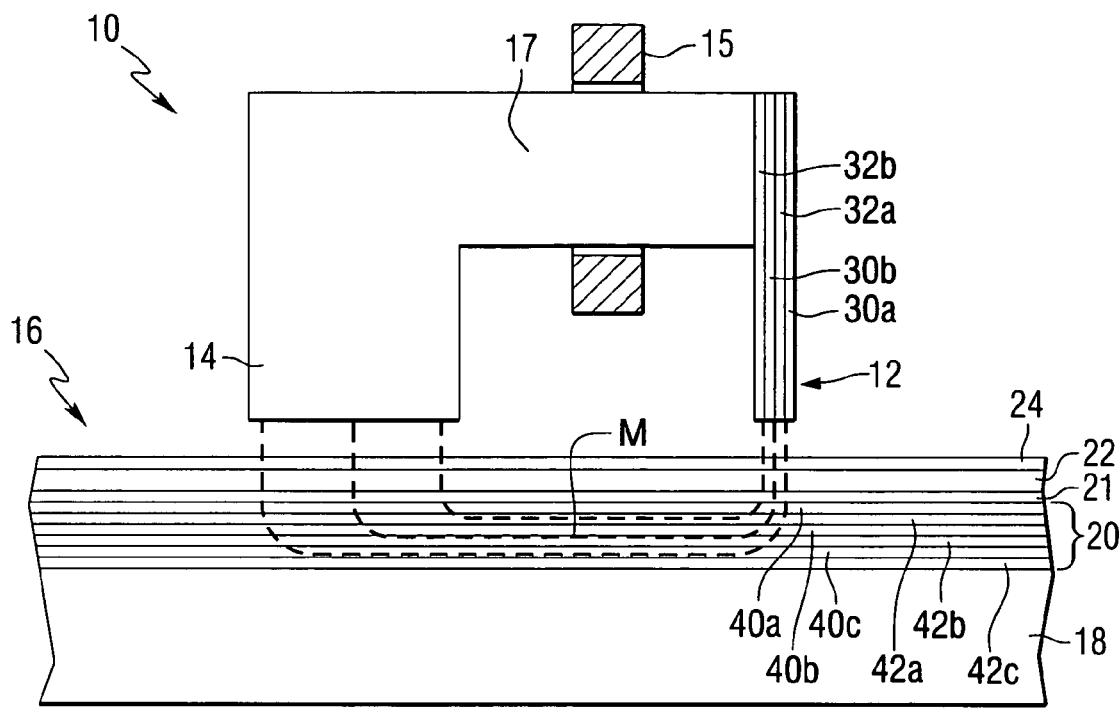
FIG. 1 is a partially schematic side view of a perpendicular magnetic recording head and recording disk illustrating the magnetic flux path through the write pole and the soft underlayer of the disk during the recording operation.

FIG. 1 is a partially schematic side view of a perpendicular magnetic recording head 10. The recording head 10 includes a trailing main write pole 12 and a return pole 14. A magnetizing coil 15 surrounds a yoke 17 which connects the write pole 12 and return pole 14. In accordance with an embodiment of the present invention, the write pole 12 is magnetically damped and has controlled magnetic damping characteristics. In the embodiment shown in FIG. 1, the damping characteristics of the write pole 12 are controlled by providing a multilayer structure comprising alternating undoped layers 30a and 30b, and doped layers 32a and 32b.

A perpendicular magnetic recording medium 16 such as a disk is positioned under the recording head 10. The recording medium 16 travels in the direction of the arrow shown in FIG. 1 during recording. The recording medium 16 includes a substrate 18, which may be made of any suitable material such as ceramic glass, amorphous glass or NiP plated AlMg. A magnetically soft underlayer 20 is deposited on the substrate 18. In accordance with an embodiment of the present invention, the soft underlayer 20 is magnetically damped and has controlled damping characteristics. In the embodiment shown in FIG. 1, the damping characteristics of the soft underlayer 20 are controlled by providing a multilayer structure including undoped layers 40a, 40b and 40c, and doped layers 42a, 42b and 42c. A thin exchange decouple layer 21 made of a non-magnetic material such as CoCr, Cr or an oxide may optionally be deposited on the soft underlayer 20. A magnetically hard perpendicular recording layer 22 is deposited on the exchange decouple layer 21. Some suitable hard magnetic materials for the recording layer 22 include multilayers of Co/Pd or Co/Pt, $L1_0$ phases of CoPt, FePt, CoPd and FePd and hcp Co alloys. A protective overcoat 24 such as diamond-like carbon may be applied over the recording layer 22. As shown in FIG. 1, during writing operations, magnetic flux is directed along a path M from the main pole 12 perpendicularly through the recording layer 22, then in the plane of the soft underlayer 20 back to the return pole 14.

Figure 2:
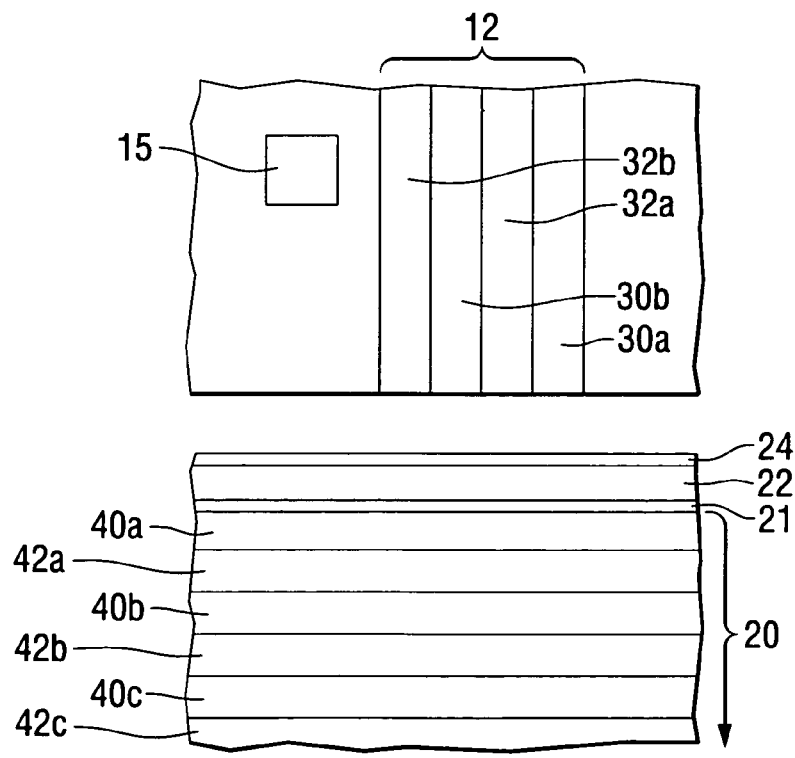
FIG. 2 is a partially schematic side view of a portion of the perpendicular magnetic recording head and recording medium of FIG. 2 illustrating a multilayer write pole of the recording head and a multilayer soft magnetic underlayer of the recording medium in accordance with an embodiment of the present invention.

Details of the multilayer write pole 12 and multilayer soft underlayer 20 are shown in FIG. 2. The alternating undoped 30a, 30b and doped 32a, 32b layers of the write pole 12 are arranged such that the undoped film 30a is located at the trailing edge of the write pole 12. The undoped films 40a, 40b, 40c and doped films 42a, 42b, 42c of the soft underlayer 20 are arranged such that the undoped film 40a is located at the top of the multilayer structure. Although the write pole 12 shown in FIGS. 1 and 2 comprises four film layers, any other suitable number of layers may be used in accordance with the present invention, e.g., from 1 to 10 or 20 or more. Although the soft underlayer 20 shown in FIGS. 1 and 2 comprises six film layers, any other suitable number of layers may be used in accordance with the present invention, e.g., from 1 to 10 or 20 or more.

In accordance with the present invention, the material of the write pole and the material of the soft underlayer are magnetically damped such that their magnetic damping factors are increased in comparison with typical materials. For example, the write pole and the soft underlayer include dopants which increase magnetic damping of the write pole and the soft underlayer. Each of the write pole and soft underlayer may have an overall magnetic damping factor $\alpha$ of at least about 0.05. A typical magnetic damping factor for the materials for the write pole and soft underlayer in this invention is from about 0.08 to 0.5. For example, the magnetic damping factor $\alpha$ may be from about 0.1 to about 0.3. In one embodiment, the magnetic damping factors $\alpha$ of the write pole and the soft underlayer are substantially the same, i.e., their damping factors $\alpha$ are within 20 percent of each other. The increased damping in the SUL and/or writing pole suppresses the precessional motion of the SUL and write pole, thereby reducing head field fluctuations and jitter. In contrast, typical ferromagnetic materials used for the SUL and write pole have relatively small damping values of approximately 0.01 to 0.03, resulting in large amplitude ringing when the magnetization is abruptly driven out-of-equilibrium.

In the multilayer write pole and soft underlayer embodiment shown in FIGS. 1 and 2, relatively low magnetic damping layers are alternated with relatively high magnetic damping layers, with the layers being exchanged coupled. The terms "relatively low magnetic damping" and "relatively high magnetic damping" as used herein mean that, in a multilayer structure, one or more of the layers have a lower magnetic damping factor $\alpha$ than one or more of the other layers.

In one embodiment, the low magnetic damping layers are undoped, while the high magnetic damping layers are doped. Typical undoped materials may have a damping factor $\alpha$ of from 0.01 to 0.05, while typical doped material may have a damping factor $\alpha$ of from 0.05 to 1. When the undoped layer(s) and doped layer(s) are combined into a multilayer structure, the overall magnetic damping factor $\alpha$ of the structure is typically from about 0.08 to 0.5, as described above. The overall magnetic damping of the multilayer is dependent on the thicknesses and damping values of the undoped and doped layers.

The base material of each layer in the multilayer write pole 12 and the multilayer soft underlayer 20 may be any suitable material such as Fe, Co, Ni, alloys of these elements, and/or alloys of these elements with other elements like B, Zr and Pd. Particularly suitable materials include FeCoB and/or FeCo. The low and high magnetic damping layers may comprise the same or different base materials.

Suitable dopants for the high magnetic damping layers include rare earth and/or transition metal dopants. Such dopants may not have a quenched orbital moment and are selected such that they increase damping. Examples of suitable rare earth dopants include Ho, Nd, Sm, Dy, Pr, Tb, Er and Tm. Examples of suitable transition metal dopants include Os, Ir and Pt. The dopants are typically present in amounts less than 10 atomic percent, for example, from 1 to 5 atomic percent.

A typical total thickness for a multilayer write pole 12 as shown in FIGS. 1 and 2 is from about 50 to about 200 nm. Each of the undoped and doped layers 30a, 30b, 32a and 32b typically has a thickness of less than 100 nm in order to promote exchange coupling. For example, each undoped layer 30a and 30b may have a typical thickness of from about 10 to about 100 nm, while each doped layer 32a and 32b may have a typical thickness of from about 10 to about 100 nm. The thicknesses of the undoped and doped layers may be the same or different.

The total thickness of the multilayer soft underlayer 20 shown in FIGS. 1 and 2 is typically from about 50 to about 200 nm. The undoped and doped layers 40a, 40b, 40c, 42a, 42b, and 42c typically have thicknesses of less than 100 nm in order to promote exchange coupling. For example, each undoped layer 40a, 40b and 40c may have a typical thickness of from about 10 to about 100 nm, while each doped layer 42a, 42 and 42c may have a typical thickness of from about 10 to about 100 nm. The thicknesses of the undoped and doped layers may be the same or different.

As an alternative to the multilayer film structures shown in FIGS. 1 and 2, the write pole 12 and/or the soft underlayer 20 may comprise a single layer of doped material which exhibits the desired damping characteristics. In this embodiment, suitable materials for the write pole 12 and soft underlayer 20 include Fe, Co, Ni, alloys of these elements and/or alloys of these elements with other elements like B, Zr and Pd, which may be doped with Ho, Os, Nd and/or other dopants in amounts of from about 1 to about 10 atomic percent.

The one drawback of doping is that this tends to reduce the saturation magnetization of the host ferromagnetic alloy. This is an important issue since the write field is intimately related to the saturation magnetization of the write pole material, which needs to be as large as possible in order to be able to record on state-of-the-art high anisotropy media. However, it is still possible to increase the effective damping of the write pole with little impact on the write field by fabricating the write pole from laminates of doped and undoped material, as shown in FIGS. 1 and 2. These laminates are such that the doped and undoped layers are exchange coupled so that the overall structure exhibits increased damping over that of the undoped material. The undoped layers within the structure should be exchange coupled to at least one doped layer and the high moment layer should be at the trailing edge of the write pole. The thicknesses and number of layers can be adjusted in order to optimize performance.

Figure 3:
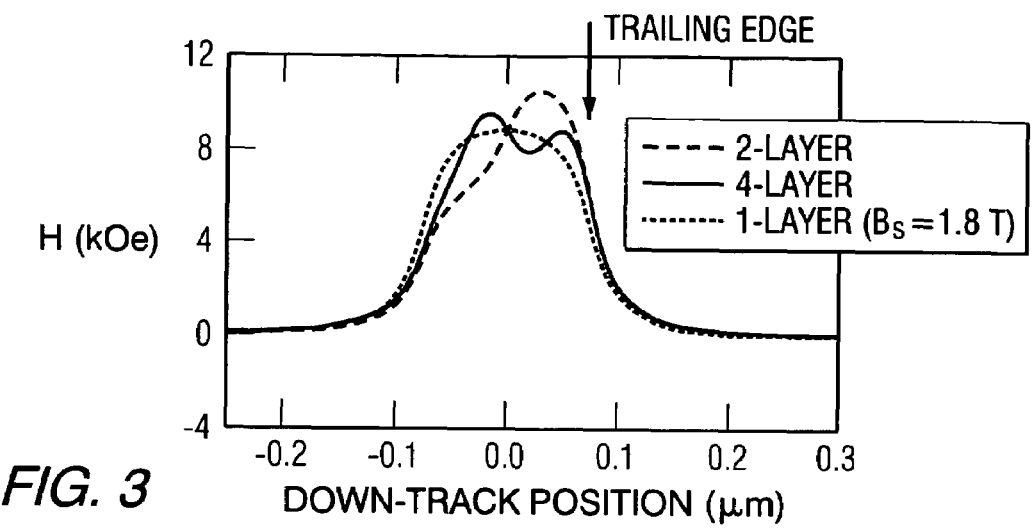
FIG. 3 is a graph of head field versus down-track position calculations based on uniformly magnetized write poles comprising for one, two and four-layer structures.

An illustration of the advantages provided by the laminate is shown in FIG. 3. FIG. 3 illustrates a calculation of the write field along the center of a track that is produced by a uniformly magnetized write pole and a perfect image in the SUL. The thickness of the pole in the down-track direction is 150 nm and it is 70 nm wide in the cross-track direction. The head to SUL spacing is 35 nm and the field is calculated 17.5 nm away from the edge of the pole, which is presumed to be in the middle of the media hard layer. The $B_s$ of the undoped ferromagnet is assumed to be 2.4 T. With regard to doping, we have found that $B_s$ decreases linearly with dopant concentration, x, while $\alpha$ increases linearly with x. A bilayer consisting of a doped layer of thickness $t_d$ and an undoped layer of thickness $t_{un}$ exhibits an overall effective damping of $\alpha_{eff}=\alpha+\Delta\alpha[t_d/(t_d+t_{un})]$, where $\alpha$ is the damping of the undoped alloy and $\Delta\alpha$ is the increase in damping for a given x. In order to highlight the effect of doping, we consider an exaggerated example where the target damping leads to a significant reduction of $B_s$ below its undoped value to 1.8 T. The write field for a single-layer write pole made from such material is shown in FIG. 3. As a comparison, we also show the write field produced by 2- and 4-layer laminates in which the doped and undoped layers are of equal thickness. In order to produce the same effective damping as the 1.8 T material, the laminate needs doped layers with twice the dopant concentration, which leads to a $B_s$ of 1.2 T. As can be seen, the 4-layer laminate produces the same magnitude of write field and even is able to yield a sharper write field gradient. The performance is improved even more by going to the 2-layer laminate.

Figure 4:
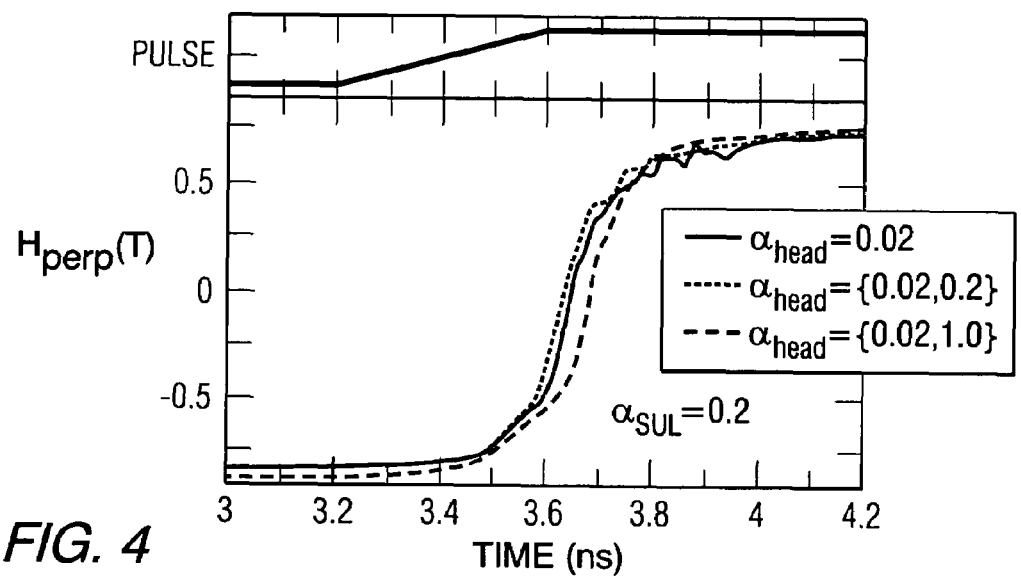
FIG. 4 is a graph illustrating head field versus time measured at the trailing edge of a write pole for different levels of damping in various multi-layer structures.

The benefits of the laminated structure of FIGS. 1 and 2 become apparent in FIG. 4. The head field of the head with a low damping value of $\alpha=0.02$ shows oscillations, which are caused by the precession of the magnetization in the pole tip. A laminated head structure with $\alpha=0.2$ in every second layer reduces the oscillations. However, the head with strongly damped layers ($\alpha=1.0$) has the cleanest behavior and the head field switches with out any oscillations.

Figure 5:
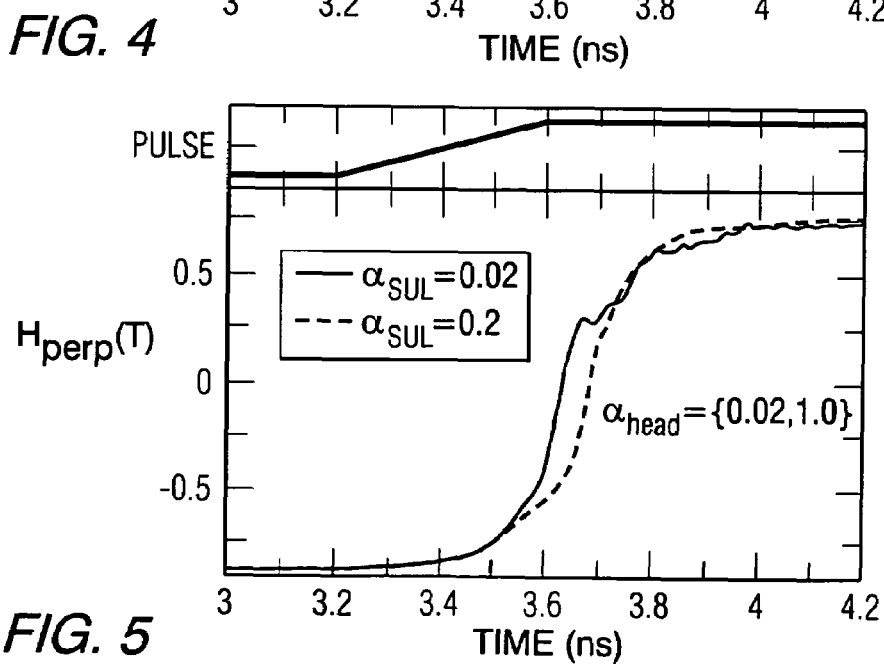
FIG. 5 is a graph of head field versus time illustrating the effect of different types of soft underlayer doping on the head field for different multilayer soft underlayer structures.

The effect of damping in the SUL on the head field is shown in FIG. 5. Not only precession of the magnetization in the head itself, but also in the SUL contributes to the oscillation of the head field. This ringing can be successfully suppressed by increasing the damping constant in the SUL to $\alpha=0.2$.

The problem of thermal stability and side-track erasure that has been so problematic for perpendicular magnetic recording (PMR) may also be reduced in accordance with the present invention. Spin waves may be excited in the SUL by the write field at recording data rates. However, these spin waves propagate away from the region around the write pole and may potentially disturb the bits stored in the hard magnetic layer, leading to thermal instability. These spin waves will be suppressed if the damping in the SUL is large enough to produce overdamped dynamics. For this issue of side track erasure, it may also be necessary to dope other ferromagnetic parts of the writer that are exposed at the air bearing surface, such as a return pole.

Figure 6:
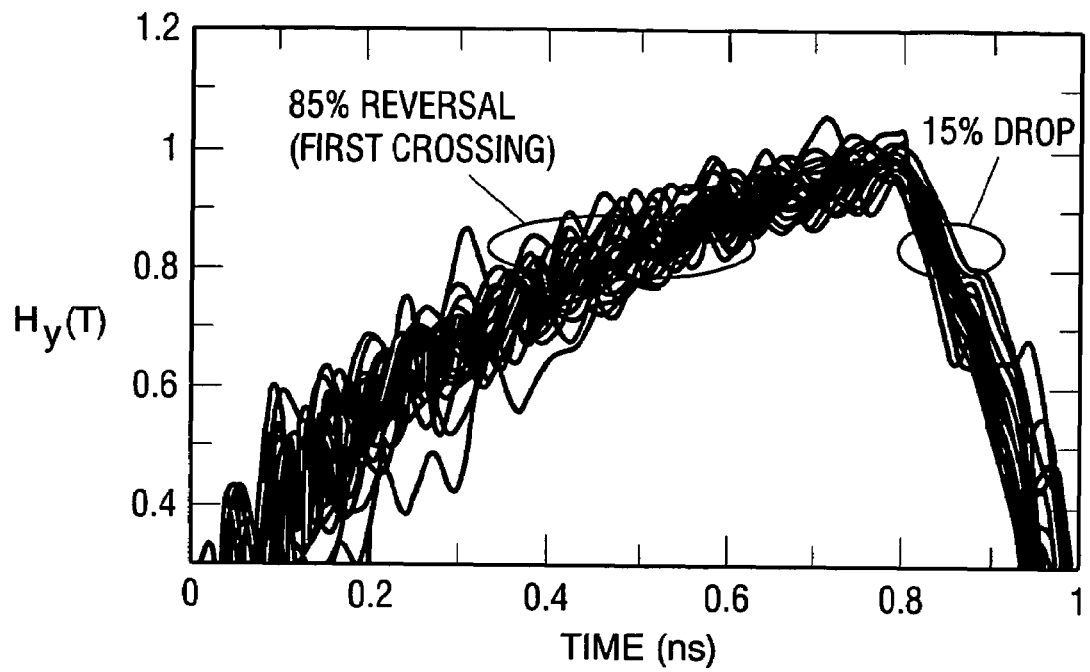
FIG. 6 is a graph of head field versus time for a perpendicular magnetic recording system in which the write pole and the soft underlayer of the recording media both have magnetic damping constants of 0.02.
Figure 7:
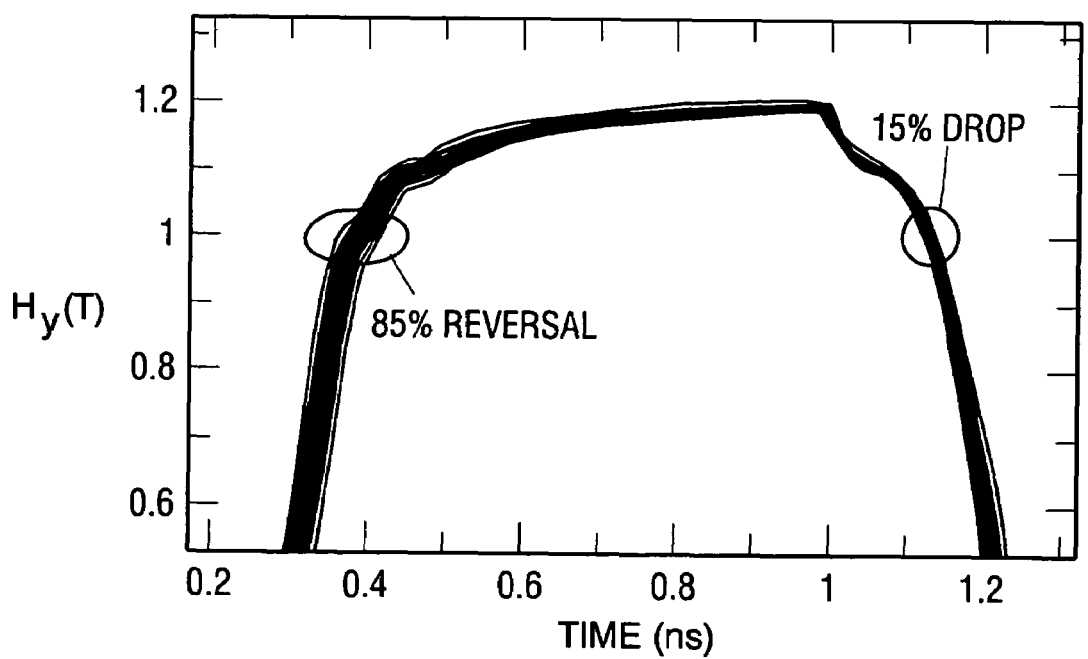
FIG. 7 is a graph of head field versus time for a perpendicular magnetic recording system in which the write pole and the soft underlayer of the recording media both have magnetic damping constants of 0.2.

Micromagnetic modeling results illustrating the effect of the damping parameter on head field fluctuation are shown in FIGS. 6 and 7. These figures show the result of 100 head switching events with a 1 Gbit/s square wave coil current waveform. FIG. 6 represents the case of relatively low damping where $\alpha=0.02$. FIG. 7 represents the case of higher damping when $\alpha=0.2$. The 100 switching events are stacked together in order to estimate the variation of the head field from period to period. A measurement was taken at −85% ($\sigma_{t85}$), which means that the head has switched and generates a perpendicular field of 85% of the saturation field opposite to its previous direction. The low damping case of FIG. 6 results in much larger head-field fluctuation than the case with the case of intermediate damping of FIG. 7. There is a standard deviation of about $\sigma_{t85}=60$ ps for $\alpha=0.02$ (both pole and SUL), and $\sigma_{t85}=11$ ps for the case with $\alpha=0.2$. Assuming a head velocity of v=14 nm/ns, the head jitter is then $\pm\sigma_{t85}*v\approx\pm0.84$ nm and 0.15 nm for $\alpha=0.02$ and $\alpha=0.2$, respectively. This indicates that increased damping is desirable for the head/SUL system.

Figure 9:
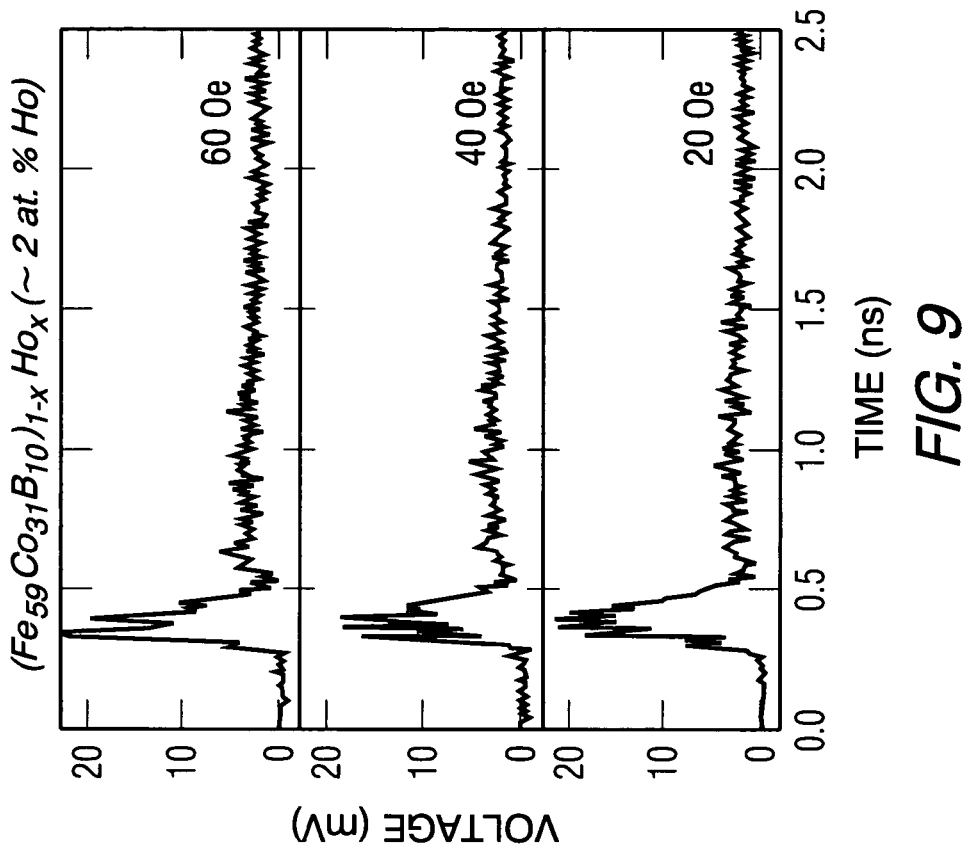
FIG. 9 includes graphs of voltage versus time for a perpendicular magnetic recording system similar to that of FIG. 8, except the FeCoB write pole and soft underlayer films have been doped with approximately 2 atomic percent Ho. The Ho dopant suppresses the precessional behavior or ringing, and provides overdamped dynamics.
Figure 8:
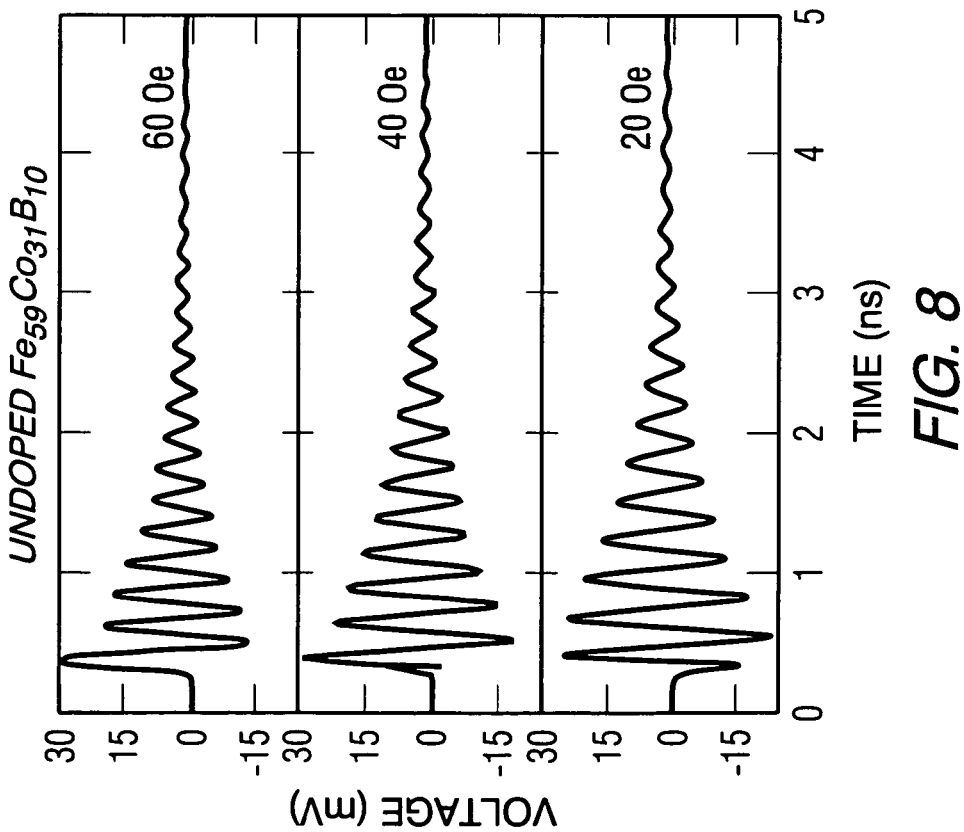
FIG. 8 includes multiple graphs of voltage versus time for a perpendicular magnetic recording system in which the write pole and soft underlayer comprise undoped FeCoB films, illustrating underdamped precessional behavior.

FIGS. 8 and 9 show time domain magnetization dynamics of undoped and doped FeCoB thin films in response to a fast rise time pulsed magnetic field. FIG. 8 includes multiple graphs of voltage versus time for a perpendicular magnetic recording system in which the write pole and soft underlayer comprise undoped FeCoB films, illustrating underdamped precessional behavior. FIG. 9 includes graphs of voltage versus time for a perpendicular magnetic recording system similar to that of FIG. 8, except the FeCoB write pole and soft underlayer films have been doped with approximately 2 atomic percent Ho. The Ho dopant suppresses the precessional behavior or ringing, and provides overdamped dynamics.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic recording system comprising:
   a magnetic recording head including a magnetically damped write pole wherein the write pole comprises a multilayer structure including at least one undoped layer having a first magnetic damping factor and at least one doped layer having a second magnetic damping factor with the first magnetic damping factor being lower than the second magnetic damping factor, wherein the layers are exchange coupled; and a recording medium including a magnetically hard recording layer and a magnetically damped soft underlayer.

2. The magnetic recording system of claim 1, wherein the write pole and the soft underlayer have magnetic damping factors $\alpha$ of at least about 0.05.

3. The magnetic recording system of claim 1, wherein the write pole and the soft underlayer have magnetic damping factors $\alpha$ of from about 0.1 to about 0.3.

4. The magnetic recording system of claim 1, wherein the write pole and the soft underlayer have magnetic damping factors $\alpha$ which are substantially the same.

5. The magnetic recording system of claim 1, wherein the first magnetic damping factor is in a range of 0.01 to 0.05, and the second magnetic damping factor is in a range of 0.05 to 1.

6. The magnetic recording system of claim 1, wherein the write pole further comprises an additional undoped layer and an additional doped layer.

7. The magnetic recording system of claim 1, wherein the layers comprise Fe, Co and/or Ni.

8. The magnetic recording system of claim 1, wherein the layer having the first magnetic damping factor is located at a trailing edge of the write pole.

9. The magnetic recording system of claim 1, wherein the multilayer structure of the write pole comprises at least two of the layers having the first magnetic damping factor and at least two of the layers having the second magnetic damping factor.

10. The magnetic recording system of claim 1, wherein the soft underlayer comprises a multilayer structure including at least one layer having a third magnetic damping factor and at least one layer having a fourth magnetic damping factor with the third magnetic damping factor being lower than the fourth magnetic damping factor.

11. The magnetic recording system of claim 10, wherein the layers in the soft underlayer are exchange coupled.

12. The magnetic recording system of claim 10, wherein the layers in the soft underlayer comprise Fe, Co and/or Ni.

13. The magnetic recording system of claim 10, wherein the layer having the third magnetic damping factor is the uppermost layer of the soft underlayer multilayer structure.

14. The magnetic recording system of claim 10, wherein the multilayer structure of the soft underlayer comprises at least two of the layers having the third magnetic damping factor and at least two of the layers having the fourth magnetic damping factor.

15. The magnetic recording system of claim 1, wherein the doped layer of the write pole and the soft underlayer comprise dopants which increase magnetic damping of the write pole and soft underlayer.

16. The magnetic recording system of claim 15, wherein the dopant comprises a total of up to 10 atomic percent of at least one rare earth and/or transition metal dopant.

17. The magnetic recording system of claim 16, wherein the dopant comprises Ho, Nd, Sm, Dy, Pr, Tb, Er, Tm, Os, Ir and/or Pt.

18. The magnetic recording system of claim 1, wherein the recording system is a perpendicular recording system.

19. A write pole of a magnetic recording head comprising a material doped with at least one rare earth and/or transition metal dopant which increases magnetic damping of the write pole, wherein the write pole comprises a multilayer structure including at least one undoped layer having a first magnetic damping factor and at least another layer having a second magnetic damping factor with the first magnetic damping factor being lower than the second magnetic damping factor, and the layers are exchange coupled.

20. The write pole of claim 19, wherein the recording head is a perpendicular recording head, and the layer having the first magnetic damping factor is located at a trailing edge of the write pole.

\* \* \* \* \*

UNITED STATES PATENT AND TRADEMARK OFFICE
CERTIFICATE OF CORRECTION

PATENT NO. : 7,595,959 B2
APPLICATION NO. : 11/170035
DATED : September 29, 2009
INVENTOR(S) : Mark William Covington et al.

It is certified that error appears in the above-identified patent and that said Letters Patent is hereby corrected as shown below:

On the Title Pg.
Page 2 Item (56)

"6,777,113 B2 8/2004 Weller et al."
Should Read
"6,777,113 B2 8/2004 Trindade et al."

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,595,959 B2  Page 1 of 1
APPLICATION NO. : 11/170035
DATED : September 29, 2009
INVENTOR(S) : Covington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this

Twenty-eighth Day of September, 2010

David J. Kappos
*Director of the United States Patent and Trademark Office*